Jan. 12, 1954  J. J. SULLIVAN ET AL  2,665,512
FISH LURE
Filed May 21, 1951
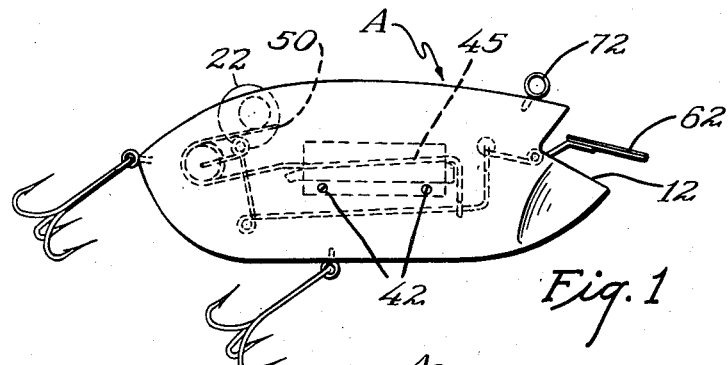
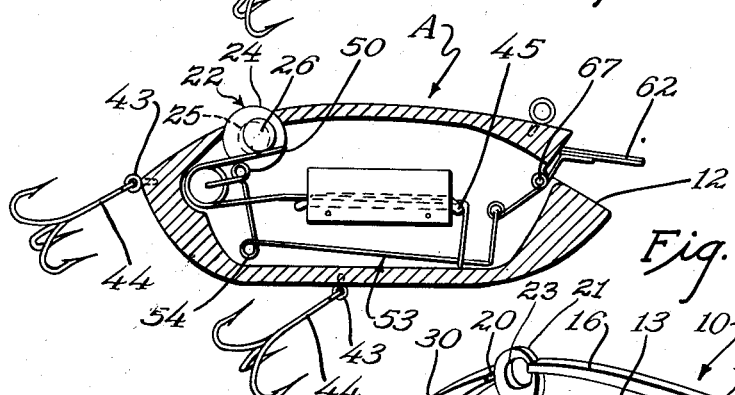
John J. Sullivan
Lester H. Martell
Ward H. Ingersoll  INVENTOR
BY Robert M. Dunning
ATTORNEY Patented Jan. 12, 1954

2,665,512

UNITED STATES PATENT OFFICE 2,665,512

FISH LURE

John J. Sullivan, Lester H. Martell, and Ward H. Ingersoll, St. Paul, Minn.

Application May 21, 1951, Serial No. 227,488

13 Claims. (Cl. 43—42.03)

This invention relates to an improvement in fish lure and deals particularly with a lure construction which will operate at a predetermined depth in the water.

Fishing lures are usually one of two types. Certain lures are made to be lighter than the water they displace and accordingly float on the surface unless they are being pulled through the water. Many such lures are provided with means of forcing them down into the water as they are pulled through the water. The depth to which such lures will sink depends almost entirely upon the speed of movement, and the faster they are moved the deeper they travel. Other lures are heavier than the water they displace and thus sink to the bottom of the body of water unless they are pulled through the water with sufficient speed to keep them elevated.

A feature of the present invention lies in the provision of a lure which is designed to seek a certain depth and to maintain a position within predetermined limits of this depth. As a result the lure will travel at approximately the desired depth regardless of the speed with which it is drawn through the water so long as the speed is sufficient to permit the lure to function in its intended manner.

A feature of the present invention lies in the provision of a lure having an adjustable vane for directing the lure upwardly or downwardly and to provide a means of operating this vane so as to maintain the lure at the proper level. When the lure reaches a predetermined depth the vane will change position so as to permit the lure to travel on a level path or to rise slightly. When the lure raises a predetermined amount, the vane again shifts position so as to direct the lure downwardly. The speed of oscillation of the lure may vary somewhat with varying speeds of travel, but the lure will remain between predetermined limits of depth whether moved slowly or swiftly.

A feature of the present invention lies in the provision of a vane movable between two extreme positions and a pressure actuated element designed to move the vane between these limits. In preferred form the pressure actuated element operates upon the vane actuating mechanism in a manner to provide a snap action so that the vane will remain either in one extreme position or the other, depending upon the pressure against the pressure sensitive element.

A feature of the present invention lies in the provision of a lure having a small expandable and contractable body supported therein capable of compressing under pressure. As the lure travels downwardly the pressure against this pressure sensitive element increases and the linkage may operate the vane into position to allow the lure to maintain its level or to rise slightly. As the lure rises the pressure upon the pressure sensitive element decreases and this element expands, permitting operation of the vane actuating linkage in the opposite direction.

A further feature of the present invention lies in the simplicity of the construction which makes the lure easy to manufacture and low in cost. A further feature lies in the fact that the level to which the lure may sink is variable within predetermined limits so that the depth to which the lure will travel may be adjusted.

These and other objects and novel features of the present invention will be more clearly and fully described in the following specification and claims.

In the drawings forming a part of the specification:

Figure 1 is a side elevation view of the lure.

Figure 2 is a sectional view through the body of the lure, exposing the working parts in the interior of the lure.

Figure 3 is a perspective view of one portion of the lure body showing the construction thereof with the adjusting cam removed.

Figure 4 is a perspective view of the opposite portion of the lure body showing the construction thereof.

Figure 5 is a perspective diagrammatic view showing the operating parts.

Figure 6 is a detail view of the adjusting cam.

The lure A is formed with a body made in two sections which are designated in general by the numerals 10 and 11. The outer shape of the lure may be varied and forms no important part of the present invention. Usually the body is so constructed that it will wobble somewhat from side to side as it travels through the water and the forward end of the body is provided with a V-shaped notch 12 therein which forms the space within which the elevating vane may operate.

As best indicated in Figure 3 of the drawings, the body portion 10 includes a rounded side wall 13 from which projects a generally rectangular boss 14. The boss 14 is provided with a groove 15 along its upper surface for a purpose which will be presently described in detail. The body portion 10 also includes a marginal upper wall 16 which connects at the rear end 17 with the bottom marginal wall 19. The thickness of the wall is proportioned to provide the proper weight in the lure body.

The upper marginal wall 16 is notched as indicated at 20 and a circular boss 21 is provided on the inner surface of the side wall adjacent to the marginal edge 16. An adjusting cam 22 is supported in a cylindrical recess 23 in the boss 21. The adjusting cam 22 is provided with a large diameter portion 24 which extends through the notch 20 so as to project slightly beyond the outer surface of the lure body. The cam 22 also includes a smaller diameter portion 25 which is accommodated in the recess 23 and is rotatably supported thereby. The cam 22 also includes an eccentric projection 26 which projects from the side of the large diameter portion 24 opposite that accommodating the pivot portion 25. The purpose of this adjusting cam will be later described in detail.

The body portion 10 also includes a projecting circular boss 27 having an axial recess 29 therein. The boss 27 is separated from the rear portion of the marginal edge wall and the rounded portion 30 so that a wire spring forming a part of the operating mechanism may encircle the boss 27 and be supported thereby.

As indicated in Figure 3 the notched portion 12 at the front end of the lure body extends entirely through the marginal wall of the body portion 10 and leaves an opening 31 through which water may flow. The body is purposely made so that water may flow freely into the body and so that water pressure may be transmitted thereinto. Sufficient opening is provided about the adjusting cam 22 so that water may flow in or out of the lure at this point.

The body portion 11 is best illustrated in Figure 4. This portion includes an outwardly bulged side wall 32 defined by an upper marginal wall 33 and a lower marginal wall 34 connected by a rear wall 35. The upper marginal wall 33 is provided with a short projection 36 designed to extend into the notch 20 of the body portion 10 to engage against the adjusting cam. The body also includes a rounded inner wall portion 37 which forms a continuation of the rounded portion 30 of the body member 10. A generally rectangular projection 39 extends inwardly from the inner surface of the side wall 32 so as to extend flush against the projection 14 of the body portion 10. Clearance holes 40 are provided in the projection 39 and corresponding threaded holes 41 are provided in the projection 14. Small fastening screws 42 extend through the openings 40 and into the threaded apertures 41 to clamp the two parts of the body together.

Screw eyes 43 are provided in the body portion 10 at desired locations to support gang hooks 44. The particular location, size and form of the hooks is not of importance except as they affect the operation of the lure.

A resilient sack or bag 45 of rubber or other suitable material is supported in the groove 15 of the projection 14. The operating mechanism of the device is best seen in Figure 5 and illustrates this sack 45 in approximately the position it would appear relative to the remainder of the device. A spring arm 46 extends over the sack 45. This arm 46 is usually bent into zig-zag form as indicated at 47 so as to increase the area of contact between the arm 46 and the sack 45. The arm 46 is bent into helical form at one end as indicated at 49. The free end 50 of the helix extends forwardly in substantially parallel relation to the adjacent end of the spring arm 46.

The opposite end of the arm 46 is bent downwardly as indicated at 51 and is looped as indicated at 52 to freely encircle a second spring arm 53. As will be later described, the arm 46 raises and lowers as the resilient bag 45 is expanded or contracted under variations of water pressure.

The arm 53 is looped bent into helical form at 54. An end of the arm extends upwardly as indicated at 55, is bent into helical form as shown at 56, and includes a free end 57 which extends rearwardly and then bends at right angles as shown at 59. The end 59 of the arm 53 is engaged in the aperture 29 of the boss 27 and is therefore anchored at this point. This arm end 59 acts as the pivot point of the arm.

The purpose of the helical coils 54 and 56 is to provide the spring action of the arm and to form a resilient force holding the guide vane in either extreme position, as will be later described. Other forms of construction may be employed to provide the necessary spring action. The end of the arm 53 opposite the anchored end 59 extends upwardly as shown at 60 and then is bent laterally transversely of the lure body as indicated at 61.

The vane 62 is secured to a pair of parallel arms 63 and 64 which are looped as indicated at 65 and 66 respectively to encircle the pivot rod 67. The pivot rod extends transversely of the lure body and is supported in apertures 69 and 70 respectively in the body portions 10 and 11. The arms 63 and 64 continue beyond the loops 65 and 66 and are terminally looped as indicated at 71 to encircle the end 61 of the arm 53.

As indicated in Figures 1 and 2 of the drawings the end 50 of the spring arm 46 engages beneath the eccentric 26 of the operating cam 22. By rotating the cam 22 about its pivot axis 25 the eccentric projection 26 may bear against the arm 50 with more or less pressure. As the spring arm 46 encircles the boss 27 and is pivotally supported thereby, the application of increased pressure against the arm end 50 applies increased force against the bag 45. As a result the point of operation of the mechanism may be varied by rotating the cam 22.

The operation of the lure will be briefly described. A screw eye 72 is provided on the body portion 10 so that the forward end of the lure body may be secured to a fishing line or leader thereupon. As the lure travels through the water the vane is normally in the position illustrated in Figure 1 at the beginning of the operation. It will be seen that the downward inclination of the vane 62 in the position shown in Figure 1 causes the upper surface of the vane to engage against the inlet end to cause the lure to sink into the water. The under-surface of the notch 12 being somewhat larger than the upper surface of this notch also has a tendency to guide the lure downwardly.

As the lure moves more deeply into the water, the water pressure upon the sack 45 increases allowing the arm 46 to swing downwardly from the position shown in Figures 1 and 5 of the drawings. The vane shown in Figure 5 is not in true relation to the remainder of the operating structure, this vane being swung upwardly from its proper position in order to show the construction thereof. Downward movement of the arm 46 does not immediately change the position of the arm 53 as the loop 52 is somewhat larger than the diameter of the arm 53. As a result the vane 62 remains in the position shown in Figure 1 until the sack 45 collapses sufficiently to urge the upper portion of the loop against the upper surface of the arm 53. This applies force upon the arm 53 tending to swing this arm downwardly. This downward force is resisted by the spring of the arm 53. Furthermore in the position shown in Figure 1, the pivot point at 71 between the arm 53 and the vane supporting arms 63 and 64 is above the level of a line drawn from the vane pivot 67 and the pivot point 59. The spring loops 54 and 56 exert a forward force upon the arm 53 which tends to hold the vane 62 in one extreme position or the other. However, when the sack 45 collapses sufficiently the downward force of the spring arm 46 against the arm 53 is sufficient to overcome the force of the arm 53 and the arm 53 snaps downwardly into the position shown in Figure 2 of the drawings. In this position the pivot point 71 connecting the vane operating arms with the arm 53 is below the level of a line extending from the axis of the pivot 67 to the pivot point 59. Thus the forward force upon the spring 53 tends to hold the vane 62 in its other extreme position shown in Figure 2.

The vane 62 is shown inclining forwardly and downwardly in the upper extreme position shown in Figure 2. In the particular form of construction illustrated the lure will tend to rise when the vane is in this position. The reason for this fact probably lies in the fact that the particular lure illustrated possesses greater weight at its rear end and thus inclines somewhat as it travels through the water. In other words, in actual practice the vane 62 is probably upwardly inclined when the vane is in the position shown in Figure 2. Furthermore, the lure illustrated is relatively buoyant and will rise more easily than it will move downwardly. Obviously the angle of inclination of the vane 62 may be regulated to suit each style and design of lure body. In other words, the vane may pivot through horizontal position so as to be upwardly inclined when in the condition shown in Figure 2 and downwardly inclined when in the condition shown in Figure 1.

As the lure moves forwardly to the vane 62 in elevated position the lure gradually rises. The pressure upon the sack 45 decreases permitting the sack to expand. This causes the arm 46 to be urged upwardly from the position shown in Figure 2. Upward movement of the arm 46 does not immediately transmit force upon the arm 53 due to the size of the loop 52. However, when sufficient expansion of the sack 45 occurs, the upward force is exerted upon the arm loop 52 and accordingly onto the adjacent portion of the arm 53. When this force is sufficient to overcome the forward force of the arm 53, tending to hold the pivot point 71 below the center line between the pivot 67 and the loop 54, the arm 53 snaps upwardly, pivoting the vane 62 into the position shown in Figure 1.

The spring arm 53 acts in the capacity of a compression spring between the fixed pivot point 59 and the end 71 of the vane supporting arms. As such it exerts a spring force against the vane supporting arms tending to hold the vane in either extreme position as the vane arm end 71 swings above or below a center line between the pivot point 67 and the fixed pivot point 59. By relieving the spring force of arm 53 and minimizing the play of loop 52, the vane may move gradually within its extreme positions when preferred. The device is extremely sensitive and will maintain a desired depth within relatively close limits. The range of limits may be varied by adjusting the amount of play in the snap toggle action of the spring arms. The depth to which the lure will travel may be varied by increasing or decreasing the initial tension on the end 50 of the spring arm 46. The operation may also be varied somewhat by variations in the resilient sack and the size and shape thereof. The sack 45 is normally hermetically sealed and contains air or gas which will compress under pressure.

In accordance with the patent statutes, the principles of construction and operation of the fish lure have been described and while it has been endeavored to set forth the best embodiment thereof, it is desired to have it understood that obvious changes may be made within the scope of the following claims without departing from the spirit of the invention.

We claim:

1. A lure including a lure body, movable means on said body for guiding said lure body upwardly or downwardly as it is drawn longitudinally through the water, resilient means biasing said movable means into either of two extreme positions, and means sensitive to variations in water pressure for actuating said resilient means to thereby cause said resilient means to urge said movable means from one extreme position to the other.

2. A fishing lure including a lure body having means thereon whereby the body may be drawn through the water, movably supported means for guiding said lure body upwardly and downwardly as it moves longitudinally through the water, a resilient lever structure on said body for resiliently urging said movably supported means into either of two extreme positions, and means sensitive to water pressure for actuating said lever structure.

3. A fishing lure including a lure body having means thereon whereby the body may be drawn through the water, guide means pivotally supported by said body and movable between two extreme positions, a lever mechanism connected to said guide means for resiliently urging said guide means toward either extreme position, and means sensitive to variations in water pressure for actuating said lever mechanism to urge the same into position to move said guide means from one extreme position to the other.

4. The structure described in claim 3 and including a lost motion connection between said pressure sensitive means and said lever mechanism.

5. The structure described in claim 3 and including means for applying initial pressure upon said pressure sensitive means, and means for varying this initial pressure.

6. A lure including a lure body having means thereon whereby the body may be drawn through the water, an elevator vane pivotally supported by said body, and projecting therefrom, a resilient toggle member pivotally connected to said vane and to said body, said vane being pivotally supported between two extreme positions, said resilient lever mechanism urging said vane toward either of said extreme positions, an expandable and contractable element in said body sensitive to variations in water pressure, a pivotally supported arm cooperable with said expandable and contractable member and pivoted thereby, and said pivoted arm being engageable with said lever mechanism to swing the toggle member from one extreme position toward the other.

7. The structure described in claim 6 and including means for resiliently urging said pivoted arm against said expandable and contractable element.

8. The structure described in claim 6 and including cam means for swinging said arm toward said expandable and contractable element.

9. The structure described in claim 6 and including means for resiliently supporting said arm for engagement against said expandable and contractable member, and means for adjusting the spring force against said expandable and contractable element.

10. A lure including a lure body having means thereon whereby the body may be drawn through the water, movable means on said body movable between two extreme positions for guiding the lure body upwardly or downwardly as it moves longitudinally through the water, means sensitive to variations in water pressure and means associated with said pressure sensitive means for actuating said guide means between said extreme positions.

11. A lure including a lure body having means thereon whereby the body may be drawn through the water, movable means on said body for guiding said lure body upwardly or downwardly as it is drawn longitudinally through the water, and means sensitive to variations in water pressure for actuating said movable means, said means sensitive to variations in water pressure comprising a sealed expandable and contractable compartment.

12. A lure including a lure body having means thereof whereby the body may be drawn through the water, movable means on said body for guiding said lure body upwardly or downwardly as it is drawn longitudinally through the water, and means sensitive to variations in water pressure for actuating said movable means, said means sensitive to variations in water pressure comprising a resilient sack.

13. A lure including a lure body having means thereon whereby the body may be drawn through the water, movable means on said body movable between two extreme positions for guiding the lure body upwardly or downwardly as it moves longitudinally through the water, means sensitive to variations in water pressure for actuating said movable means between said extreme positions, and a resilient lever structure connected to said movable means and forming a part of said means sensitive to variations in water pressure.

JOHN J. SULLIVAN.
LESTER H. MARTELL.
WARD H. INGERSOLL.

References Cited in the file of this patent
UNITED STATES PATENTS

| Number | Name | Date |
| --- | --- | --- |
| 1,870,559 | Drake | Aug. 9, 1932 |
| 2,561,750 | Overton | July 24, 1951 |